United States Patent
Kim et al.

(10) Patent No.: US 8,948,115 B2
(45) Date of Patent: Feb. 3, 2015

(54) METHOD FOR CONTROLLING UPLINK TRANSMISSION POWER FOR TRANSMITTING A PLURALITY OF CODE WORDS IN A WIRELESS COMMUNICATION SYSTEM THAT SUPPORTS A PLURALITY OF ANTENNAS, AND APPARATUS FOR PERFORMING THE METHOD

(75) Inventors: Dongcheol Kim, Anyang-si (KR); Hyunsoo Ko, Anyang-si (KR); Hangyu Cho, Anyang-si (KR); Jaehoon Chung, Anyang-si (KR); Moonil Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 101 days.

(21) Appl. No.: 13/704,165

(22) PCT Filed: Jun. 16, 2011

(86) PCT No.: PCT/KR2011/004422
§ 371 (c)(1),
(2), (4) Date: Mar. 7, 2013

(87) PCT Pub. No.: WO2011/159113
PCT Pub. Date: Dec. 22, 2011

(65) Prior Publication Data
US 2013/0163528 A1   Jun. 27, 2013

Related U.S. Application Data

(60) Provisional application No. 61/355,156, filed on Jun. 16, 2010, provisional application No. 61/356,051, filed on Jun. 18, 2010, provisional application No. 61/357,108, filed on Jun. 22, 2010, provisional application No. 61/357,542, filed on Jun. 23, 2010, provisional application No. 61/357,994, filed on Jun. 24, 2010.

(51) Int. Cl.
| | |
|---|---|
| H04W 72/04 | (2009.01) |
| H04B 7/04 | (2006.01) |
| H04W 52/36 | (2009.01) |
| H04W 52/14 | (2009.01) |
| H04W 52/42 | (2009.01) |
| H04W 52/26 | (2009.01) |

(52) U.S. Cl.
CPC ......... *H04W 72/0473* (2013.01); *H04B 7/0404* (2013.01); *H04W 52/367* (2013.01); *H04W 52/146* (2013.01); *H04W 52/42* (2013.01); *H04W 52/262* (2013.01)
USPC ............ 370/329; 370/252; 370/330; 370/335

(58) Field of Classification Search
CPC .................................................. H04W 72/0473
USPC .................................. 370/329, 252, 330, 335
See application file for complete search history.

(56) References Cited

U.S. PATENT DOCUMENTS

| | | | | |
|---|---|---|---|---|
| 5,430,760 A | * | 7/1995 | Dent | 375/144 |
| 8,385,968 B2 | * | 2/2013 | Kim et al. | 455/522 |

(Continued)

FOREIGN PATENT DOCUMENTS

EP    2086266    8/2009

*Primary Examiner* — Rasheed Gidado
(74) *Attorney, Agent, or Firm* — McKenna Long & Aldridge LLP

(57) ABSTRACT

The present invention relates to a terminal which controls uplink transmission power for transmitting a plurality of code words in a wireless communication system that supports a plurality of antennas, and a method in which the terminal performs the control. In a terminal which controls uplink transmission power for transmitting a plurality of code words in a wireless communication system that supports a plurality of antennas, a receiver receives, from a base station, an indicator that concerns the determination of the transmission power for each code word of the plurality of code words. A processor determines uplink transmission power for transmitting the plurality of code words on the basis of the indication value of the indicator. If the indication value is zero, the processor allocates the same uplink transmission power to each of the plurality of code words.

12 Claims, 4 Drawing Sheets

(56) References Cited

U.S. PATENT DOCUMENTS

| | | | |
|---|---|---|---|
| 8,521,210 B2* | 8/2013 | Dai et al. | 455/522 |
| 8,731,596 B2* | 5/2014 | Yeon et al. | 455/522 |
| 8,768,401 B2* | 7/2014 | Zhou et al. | 455/522 |
| 2010/0061284 A1 | 3/2010 | Chen et al. | |
| 2010/0080187 A1 | 4/2010 | Papasakellariou et al. | |
| 2010/0246463 A1 | 9/2010 | Papasakellariou et al. | |
| 2011/0243007 A1* | 10/2011 | Xiao | 370/252 |
| 2012/0113851 A1* | 5/2012 | Schober et al. | 370/252 |

* cited by examiner

METHOD FOR CONTROLLING UPLINK TRANSMISSION POWER FOR TRANSMITTING A PLURALITY OF CODE WORDS IN A WIRELESS COMMUNICATION SYSTEM THAT SUPPORTS A PLURALITY OF ANTENNAS, AND APPARATUS FOR PERFORMING THE METHOD

This Application is a 35 U.S.C. §371 National Stage Entry of International Application No. PCT/KR2011/004422, filed Jun. 16, 2011 and claims the benefit of U.S. Provisional Application Nos. 61/355,156, filed Jun. 16, 2010; 61/356, 051, filed Jun. 18, 2010; 61/357,108, filed Jun. 22, 2010; 61/357,542, filed Jun. 23 2010; 61/357,994, filed Jun. 24, 2010, all of which are incorporated by reference in their entirety herein.

TECHNICAL FIELD

The present invention relates to a wireless communication, and more particularly, to a method of controlling an uplink transmit power for transmitting a plurality of codewords in a wireless communication system supportive of a plurality of antennas and apparatus therefor.

BACKGROUND ART

First of all, 3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system.

E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project Technical Specification Group Radio Access Network' can be referred to.

Referring to FIG. 1, E-UMTS consists of a user equipment (UE), a base station (eNode B: eNB) and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is configured to have one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA (wideband code division multiple access) but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

Recently, ongoing standardization of the next technology of LTE is performed by 3GPP. Such technology shall be named LTE-A. Big differences between LTE system and LTE-A system may include a system bandwidth difference and an adoption of a relay node.

The goal of LTE-A system is to support maximum 100 MZ wideband. To this end, LTE-A system uses carrier aggregation or bandwidth aggregation to achieve the wideband using a plurality of frequency blocks.

According to the carrier aggregation, a plurality of frequency blocks are used as one wide logical frequency band to use wider frequency band. And, a bandwidth of each frequency block may be defined based on a bandwidth of a system block used by LTE system. And, each frequency block is transmitted using a component carrier.

According to 3GPP LTE Rel-8 of the related art, a user equipment performs a power control operation for a system based on a single antenna, a single layer and a single codeword. Yet, in a system that adopts to use multiple antennas, multiple layers and multiple codewords, a user equipment is unable to sufficiently support a multi-antenna, multi-layer and multi-codeword based power control operation with the single-antenna based power control operation of the related art. However, efforts have not been made to research and develop the multi-antenna, multi-layer and multi-codeword based power control operation in detail.

DISCLOSURE OF THE INVENTION

Technical Task

A technical task intended to achieve in the present invention is to provide a method for a user equipment to control an uplink transmit power for transmitting a plurality of codewords via a plurality of antennas in a wireless communication system.

Another technical task intended to achieve in the present invention is to provide a user equipment, by which an uplink transmit power for transmitting a plurality of codewords via a plurality of antennas can be controlled in a wireless communication system.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve the technical task and in accordance with the purpose of the present invention, as embodied and broadly described, a method of controlling an uplink transmission power for transmitting a plurality of codewords by a user equipment in a wireless communication system supportive of a plurality of antennas, according to the present invention may include the steps of receiving an indicator regarding transmission power determination per codeword for the plurality of the codewords from an eNode B and determining the uplink transmission power for transmitting the plurality of the codewords based on an indication value of the indicator. Preferably, if the indicator value is 0, a same uplink transmit power is assigned to each of the plurality of the codewords. Preferably, if the indication value is 1.25, the uplink transmission power is assigned to each of the plurality of the codewords based on a size of transmission information. More preferably, the method further includes the step of assigning the same uplink transmission power to each of the plurality of the antennas corresponding to the plurality of the codewords, respectively. Preferably, the method further includes the step of controlling a total uplink transmission power determined for transmitting the plurality of the codewords not to exceed a maximum power limit value. Preferably, the uplink transmission power is controlled further based on an indicator indicating that a specific antenna among a plurality of the antennas is turned off. Preferably, the determined uplink transmit power for transmitting the plurality of the codewords is provided for a transmission in a serving cell among component carriers. Preferably, the determination of the uplink transmission power for transmitting the plurality of the codewords is made for transmitting a physical uplink shared channel (PUSCH). Preferably, the indicator includes a deltaMCS-Enabled corresponding to a user equipment (UE)-specific parameter.

To achieve another technical task and in accordance with the purpose of the present invention, as embodied and broadly described, a user equipment, configured to control an uplink transmission power for transmitting a plurality of codewords in a wireless communication system supportive of a plurality of antennas, according to the present invention includes a receiver configured to receive an indicator regarding transmission power determination per codeword for the plurality of the codewords from an eNode B and a processor configured to determine the uplink transmission power for transmitting the plurality of the codewords based on an indication value of the indicator. Preferably, if the indicator value is 0, the processor assigns a same uplink transmission power to each of the plurality of the codewords. Preferably, if the indication value is 1.25, the processor assigns the uplink transmission power to each of the plurality of the codewords based on a size of transmission information. Preferably, the indicator includes a deltaMCS-Enabled corresponding to a user-equipment (UE) specific parameter.

Advantageous Effects

Accordingly, a power control of a user equipment, which uses multiple antennas, multiple layers and multiple codewords, can be further facilitated and simplified by various uplink control formals proposed by the present invention.

Moreover, by the signal transmission under the power control of the user equipment, which uses multiple antennas, multiple layers and multiple codewords, reception performance of an eNode B can be enhanced.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes IEEE (institute of electrical and electronics engineers) 802.16 system or 3GPP ($3^{rd}$ generation partnership project) system, they are applicable to other random mobile communication systems except unique features of IEEE 802.16 system or 3GPP system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS), and the like. And, assume that a base station is a common name of such a random node of a network stage communicating with a terminal as a Node B, an eNode B, a base station (BS), an access point (AP) and the like.

In a mobile communication system, a user equipment may be able to receive information in downlink from an eNode B and transmit information in uplink to the eNode B. The informations transmitted or received by the user equipment may include data and various control informations. And, various kinds of physical channels may exist in accordance with types and usages of the informations transmitted or received by the user equipment.

Figure 1:
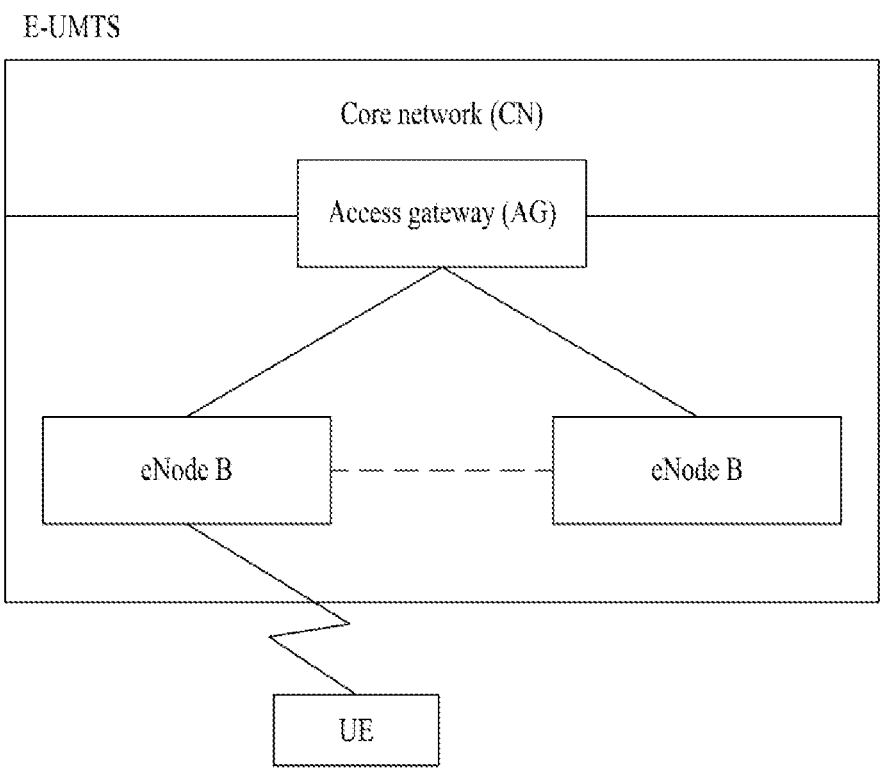
FIG. 1 is a schematic diagram of E-UMTS network structure as an example of a wireless communication system.
Figure 2:
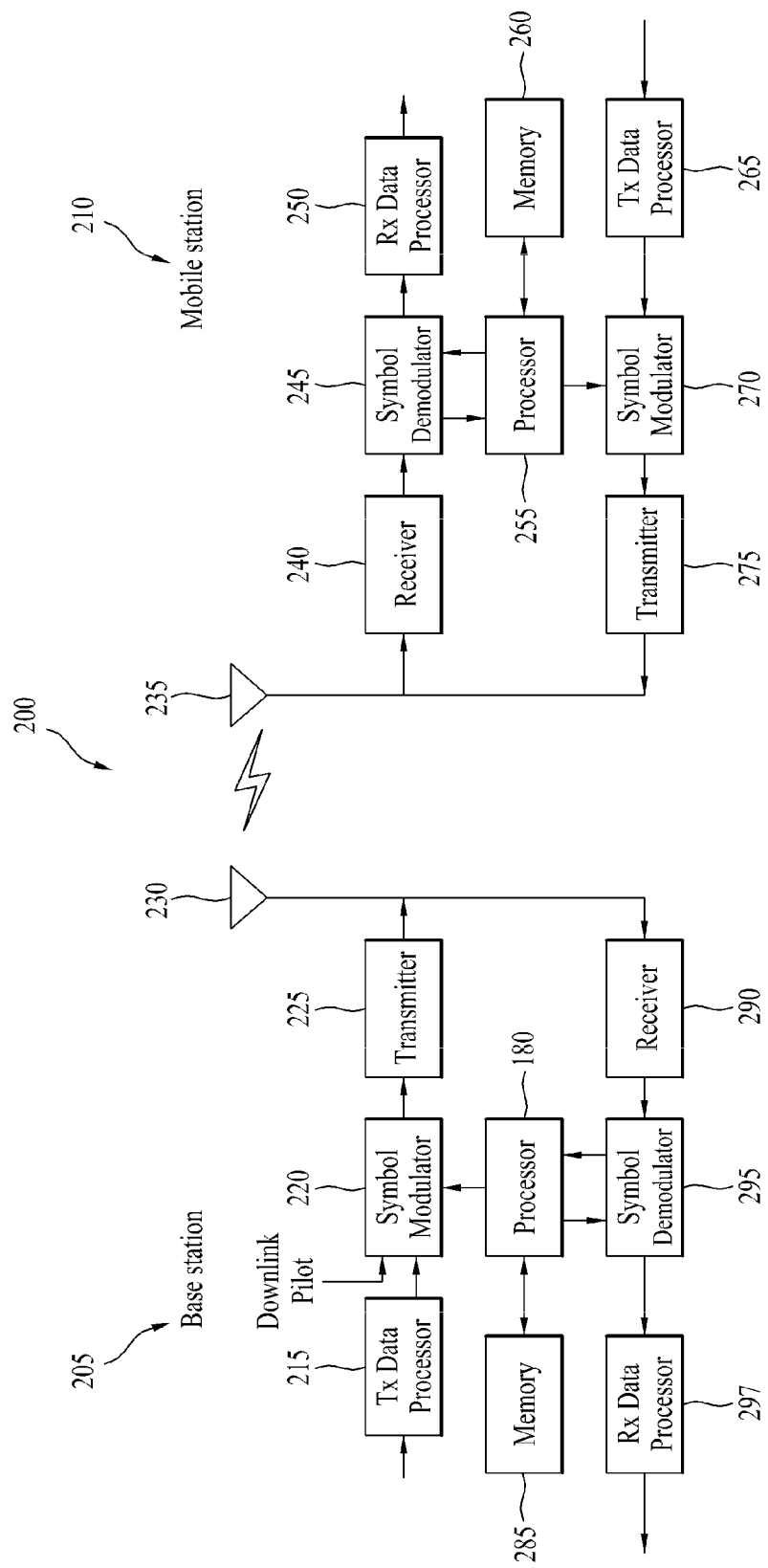
FIG. 2 is a block diagram for configurations of an eNode B 205 and a user equipment 210 in a wireless communication system 200.

FIG. 2 is a block diagram for configurations of an eNode B 205 and a user equipment 210 in a wireless communication system 200.

Although one eNode B 205 and one user equipment 210 are shown in the drawing to schematically represent a wireless communication system 200, the wireless communication system 200 may include at least one eNode B and/or at least one user equipment.

Referring to FIG. 2, an eNode B 205 may include a transmitted (Tx) data processor 215, a symbol modulator 220, a transmitter 225, a transceiving antenna 230, a processor 280, a memory 285, a receiver 290, a symbol demodulator 295 and a received data processor 297. And, a user equipment 210 may include a transmitted (Tx) data processor 265, a symbol modulator 275, a transmitter 275, a transceiving antenna 235, a processor 255, a memory 260, a receiver 240, a symbol demodulator 255 and a received data processor 250. Although the eNode B/user equipment 205/210 includes one antenna 230/235 shown in the drawing, each of the eNode B205 and the user equipment 210 includes a plurality of antennas. Therefore, each of the eNode B205 and the user equipment 210 according to the present invention supports an MIMO (multiple input multiple output) system. And, the eNode B205 according to the present invention may support both SU-MEVIO (single user-MIMO) and MU-MEVIO (multi user-MIMO) systems.

In downlink, the transmitted data processor 215 receives traffic data, performs coding on the received traffic data by formatting, interleaves the coded traffic data, modulates (or symbol maps) the interleaved data, and then provides modulated symbols (data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 225. In doing so, each of the transmitted symbols may include the data symbol, the pilot symbol or a signal value of zero (i.e., null). In each symbol duration, pilot symbols may be contiguously transmitted. In doing so, the pilot symbols may include symbols of frequency division multiplexing (FDM), orthogonal frequency division multiplexing (OFDM), time division multiplexing (TDM), or code division multiplexing (CDM).

The transmitter 225 receives the stream of the symbols, converts the received stream to at least one or more analog signals, additionally adjusts the analog signals (e.g., amplification, filtering, frequency upconverting, etc.), and then generates a downlink signal suitable for a transmission on a radio channel. Subsequently, the downlink signal is transmitted to the user equipment via the transmitting antenna 230.

In the configuration of the user equipment 210, the receiving antenna 235 receives the downlink signal from the eNode B and then provides the received signal to the receiver 240. The receiver 240 adjusts the received signal (e.g., filtering, amplification and frequency downconverting), digitizes the adjusted signal, and then obtains samples. The symbol demodulator 245 demodulates the received pilot symbols and then provides them to the processor 255 for channel estimation.

The symbol demodulator 245 receives a frequency response estimated value for downlink from the processor 255, obtains data symbol estimated values (i.e., estimated values of the transmitted data symbols) by performing data demodulation on the received data symbols, and then provides the data symbol estimated values to the received (Rx) data processor 250. The received data processor 250 reconstructs the transmitted traffic data by performing demodulation (i.e., symbol demapping, deinterleaving and decoding) on the data symbol estimated values.

The processing by the symbol demodulator 245 and the processing by the received data processor 250 are complementary to the processing by the symbol modulator 220 and the processing by the transmitted data processor 215 in the eNode B205, respectively.

Regarding the user equipment 210 in uplink, the transmitted data processor 265 provides data symbols by processing the traffic data. The symbol modulator 270 provides a stream of symbols to the transmitter 275 by receiving the data symbols, multiplexing the received data symbols, and then performing modulation on the multiplexed symbols. The transmitter 275 generates an uplink signal by receiving the stream of the symbols and then processing the received stream. The generated uplink signal is then transmitted to the eNode B205 via the transmitting antenna 235.

In the eNode B205, the uplink signal is received from the user equipment 210 via the receiving antenna 230. The receiver 290 obtains samples by processing the received uplink signal. Subsequently, the symbol demodulator 295 provides pilot symbols received in uplink and a data symbol estimated value by processing the obtained samples. The received data processor 297 reconstructs the traffic data transmitted from the user equipment 210 by processing the data symbol estimated value.

The processor 255/280 of the user equipment/eNode B210/205 directs operations (e.g., control, adjustment, management, etc.) of the user equipment/eNode B210/205. The processor 255/280 may be connected to the memory unit 260/285 configured to store program codes and data. The memory 260/285 is connected to the processor 255/280 to store operating systems, applications and general files.

The processor 255/280 may be called one of a controller, a microcontroller, a microprocessor, a microcomputer and the like. And, the processor 255/280 may be implemented using hardware, firmware, software and/or any combinations thereof. In the implementation by hardware, the processor 255/280 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 255/280 or saved in the memory 260/285 to be driven by the processor 255/280.

Layers of a radio protocol between a user equipment 210 and an eNode B205 may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between UE and network. A user equipment and an eNode B may be able to exchange RRC messages with each other via a radio communication network using RRC layers.

3GPP ($3^{rd}$ generation partnership project) designates LTE-A (long term evolution-advanced) system to a next generation wireless communication system next to the LTE system to meet the future-oriented service request. The LTE-A system adopts the carrier aggregation (hereinafter abbreviated CA) technology to aggregate and use a plurality of component carriers (CCs). Therefore, the LTE-A system enhances a transmission bandwidth of a user equipment and also increases frequency use efficiency. The LTE-A system is able to extend bandwidths up to 100 MHz through the carrier aggregation. In particular, the LTE-A system re-defines the carrier defined by the conventional LTE rel 8/9 up to maximum 20 MHz into a component carrier and enables one user equipment to use maximum 5 component carriers through the carrier aggregation technology.

The current carrier aggregation technology can be characterized as follows.

(1) The current carrier aggregation technology supports the aggregation of continuous component carriers and the aggregation of discontinuous component carriers.

(2) The number of carriers aggregated in UL can be different from that of carriers aggregated in DL. If the compatibility with a conventional system is required, each of the UL and the DL should be constructed with the same number of component carriers.

(3) By configuring component carriers in UL and component carriers in DL in a manner that the number of the component carriers in UL differs from the number of the component carriers in DL, different transmission bandwidths can be obtained.

(4) For a user equipment, each component carrier independently carries one transport block and is provided with an independent HARQ (hybrid automatic repeat request) mechanism.

Unlike the legacy LTE system that uses one component carrier, the carrier aggregation, which uses a plurality of component carriers, needs a method of managing component carriers effectively. In order to efficiently manage component carriers, it is able to classify the component carriers in accordance with roles and features. In carrier aggregation, multiple carriers can be classified into primary component carrier (PCC) and a secondary component carrier (SCC), which may become UE-specific parameters. In particular, the primary component carrier is the component carrier that becomes the center of management of component carriers in case of using several component carriers. And, one primary component carrier is defined for each user equipment. The primary component carrier (PCC) may be called a primary cell (Pcell) or the like. A cell on which a user equipment is currently transmitting/receiving a signal among component carriers is called a serving cell. In case that a signal is currently transmitted/received on Pcell, the Pcell becomes a serving cell.

The rest of the component carriers except one primary component carrier are defined as secondary component carriers (SCC). The secondary component carrier may be called a secondary cell (Scell) or the like. The primary component carrier is able to play a role as a core carrier for managing all component carriers. And, the rest of the secondary component carriers can play a role in providing an additional frequency resource to provide a high data rate. For instance, an eNode B is able to establish a connection (RRC) for signaling with a user equipment using the primary component carrier. Providing information for security and higher layers can be achieved using the primary component carrier as well. Actually, in case that one component carrier exists only, the corresponding component carrier may become a primary component carrier. In this case, the corresponding component carrier may be responsible for the same role of a carrier of the legacy LTE system.

The eNode B is able to assign an activated component carrier (hereinafter abbreviated ACC) among a plurality of component carriers to the user equipment. The user equipment is already aware of the activated component carrier (ACC) assigned to itself. The user equipment gathers responses to a plurality of PDCCHs received from DL PCell and DL SCell and is then able to transmit the gathered responses to PUCCH via UL PCell.

According to a related art, a user equipment performs a power control operation for single-antenna, single-layer and single-codeword based system. Yet, in a system using multiple antennas, multiple layers and multiple codewords, a user equipment is unable to sufficiently support a multi-antenna, multi-layer and multi-codeword based power control operation with the single-antenna based power control operation of the related art. To this end, the present invention proposes parameters and operations required for a power control of a user equipment using multiple antennas.

Since 3GPP Release-10 system supports 2 codewords, 4 layers and 4 Tx antennas, the concepts of transmit power (or transmission power) per codeword, transmit power per layer and transmit power per antenna are introduced. The power for each codeword may be identical or different. In case that transmit powers are different per codeword, it may become different because different MCS (modulation and coding scheme) levels are applied to codewords, respectively. The maximum power per antenna (port) may be identical or different. And, the maximum power may be identical or different per antenna group.

In a multicarrier introduced system, a processor 250 of a user equipment may need to perform an uplink power control per component carrier (CC) index, per codeword index and per antenna port index.

Figure 3:
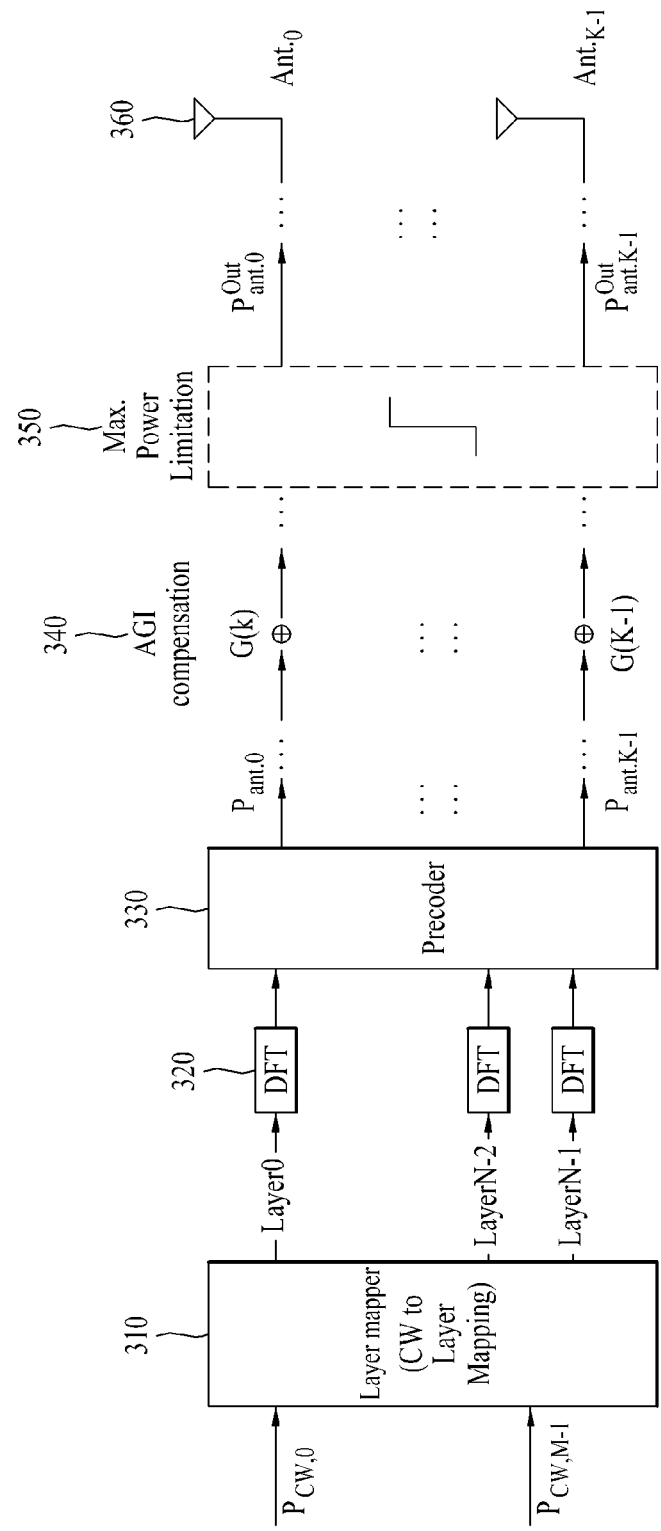
FIG. 3 is a diagram for one example of an uplink MIMO transmission chain of 3GPP Release-10 system as one example of a wireless communication system.

FIG. 3 is a diagram for one example of an uplink MIMO transmission chain of 3GPP Release-10 system as one example of a wireless communication system.

Referring to FIG. 3, an uplink (hereinafter abbreviated UL) MIMO transmission of Release-10 system is represented for notation of a power at each reference point. In FIG. 3, M codewords exist for a user equipment and a power of $m^{th}$ codeword is noted as $P_{cw,m}$. Moreover, assume that N layers and K Tx antennas exist for a user equipment. For clarity and convenience of notation, a power of $k^{th}$ antenna after passing through a precoder 330 is noted as $P_{ant,k-1}$ and a radiated power of the $k^{th}$ antenna is noted as $P^{out}_{ant,k-1}$. If AGI compensation and maximum power limit are not applied, $P^{out}_{ant,k-1}$ becomes equal to $P_{ant,k-1}$.

The inputted M codewords ($P_{cw,0}, \ldots, P_{cw,m-1}$) are mapped to layers by a layer mapper 310, Fourier-transformed by a DFT (discrete Fourier transform) module 320, and then inputted to the precoder 330. The precoder 330 performs precoding. And, the powers of the antennas via the precoder 330 can be noted as $P_{ant,0}, P_{ant,1}, \ldots, P_{ant,K-1}$, respectively.

AGI (antenna gain imbalance) compensating module 340 performs AGI compensation on the powers $P_{ant,0}, P_{ant,1}, \ldots, P_{ant,K-1}$ of antennas through the precoder 330. The AGI (antenna gain imbalance) compensating module 340 performs transmit power compensation to remove imbalance occurring between antennas due to hand clipping and the like. The AGI compensation value is notified to the user equipment by the eNode B or may be defined in advance. A maximum power control module 350 performs an operation of limiting the AGI compensated power of each of the antennas to a value smaller than the maximum power. For instance, the maximum power control module 350 is able to limit the transmit power of each of the antennas to a value smaller than 23 dBm. The transmit powers of the antennas through the maximum power control module 350 can be noted as $P^{out}_{ant,0}, P^{out}_{ant,1}, \ldots, P^{out}_{ant,k-1}$, respectively. Each of antennas $Ant_0, Ant_1, \ldots, Ant_{K-1}$ transmit signals at transmission power of $P^{out}_{ant,0}, P^{out}_{ant,1}, \ldots, P^{out}_{ant,k-1}$, respectively.

If a signal is transmitted with the same transmit power for each of the antennas $Ant_0, Ant_1, \ldots, Ant_{K-1}$, it is most preferable for reception performance enhancement of an eNode B.

Tables 1 to 5 show types of a precoder used by LTE-A system, respectively. In the following description, a precoder scaling factor (PSF) may be regarded as a scaling factor for maintaining a power despite passing through the precoder block 330. For instance, assuming a precoding matrix in the communication specification of LTE-A system, it may be interpreted as 1/No. Antenna.

TABLE 1
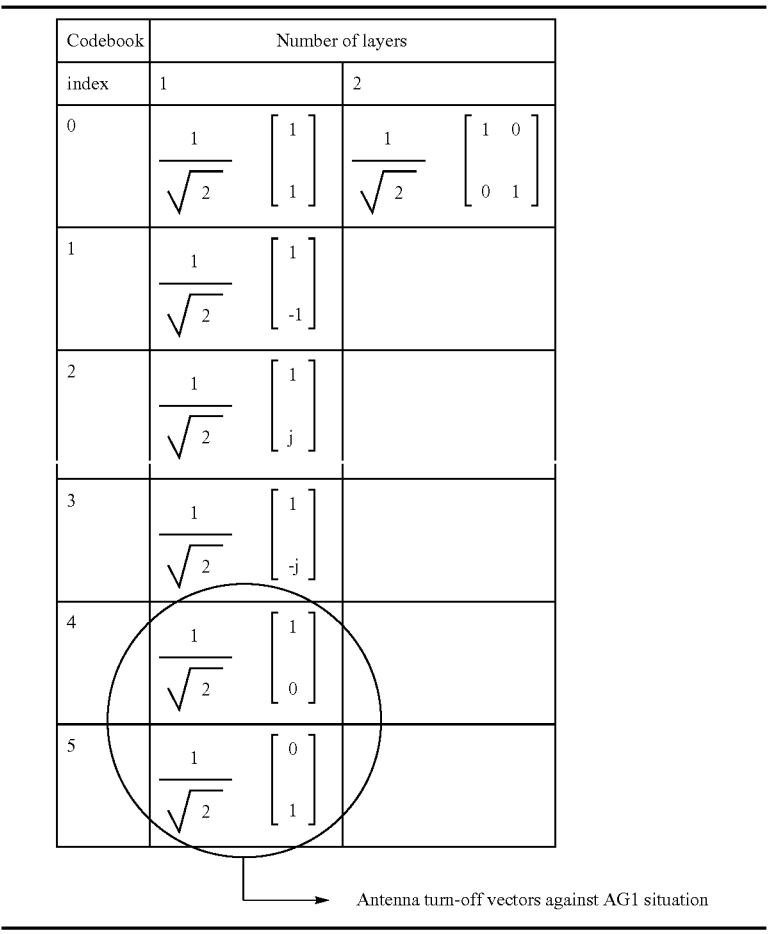
Table 1 shows one example of a precoder for 2 Tx. A part marked with a circle indicates antenna turn-off vectors against AGI situation.
TABLE 2
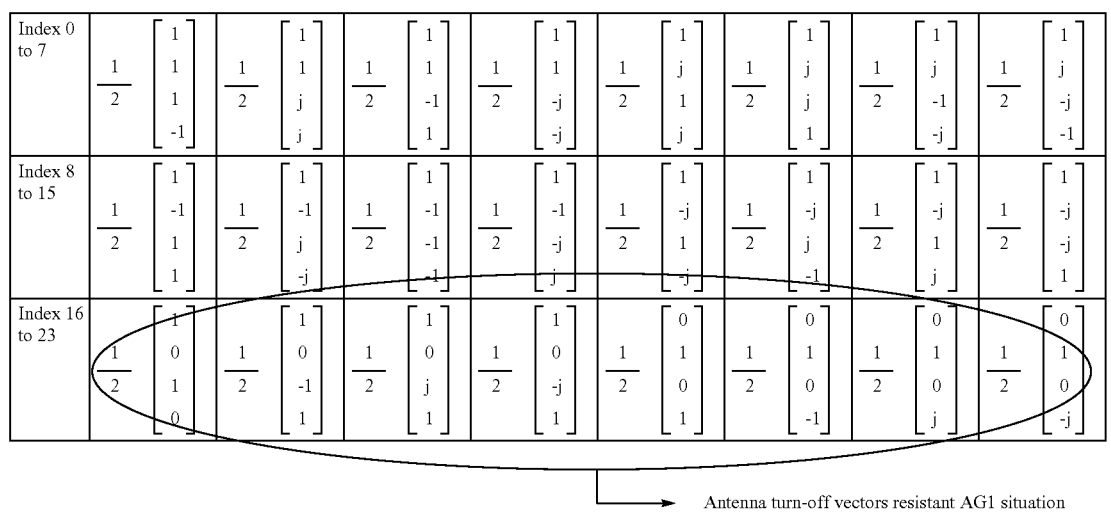

Table 2 shows one example of a precoder for 4 Tx Rank-1. A part marked with a circle indicates antenna turn-off vectors against AGI situation.

TABLE 3

| Index 0 to 7 | $\frac{1}{2}\begin{bmatrix} 1 & 0 \\ 1 & 0 \\ 0 & 1 \\ 0 & -j \end{bmatrix}$ $\frac{1}{2}\begin{bmatrix} 1 & 0 \\ 1 & 0 \\ 0 & 1 \\ 0 & j \end{bmatrix}$ $\frac{1}{2}\begin{bmatrix} 1 & 0 \\ -j & 0 \\ 0 & 1 \\ 0 & 1 \end{bmatrix}$ $\frac{1}{2}\begin{bmatrix} 1 & 0 \\ -j & 0 \\ 0 & 1 \\ 0 & -1 \end{bmatrix}$ $\frac{1}{2}\begin{bmatrix} 1 & 0 \\ -1 & 0 \\ 0 & 1 \\ 0 & -j \end{bmatrix}$ $\frac{1}{2}\begin{bmatrix} 1 & 0 \\ -1 & 0 \\ 0 & 1 \\ 0 & j \end{bmatrix}$ $\frac{1}{2}\begin{bmatrix} 1 & 0 \\ j & 0 \\ 0 & 1 \\ 0 & 1 \end{bmatrix}$ $\frac{1}{2}\begin{bmatrix} 1 & 0 \\ j & 0 \\ 0 & 1 \\ 0 & -1 \end{bmatrix}$ |
| --- | --- |
| Index 8 to 16 | $\frac{1}{2}\begin{bmatrix} 1 & 0 \\ 0 & 1 \\ 1 & 0 \\ 0 & 1 \end{bmatrix}$ $\frac{1}{2}\begin{bmatrix} 1 & 0 \\ 0 & 1 \\ 1 & 0 \\ 0 & -1 \end{bmatrix}$ $\frac{1}{2}\begin{bmatrix} 1 & 0 \\ 0 & 1 \\ -1 & 0 \\ 0 & 1 \end{bmatrix}$ $\frac{1}{2}\begin{bmatrix} 1 & 0 \\ 0 & 1 \\ -1 & 0 \\ 0 & 1 \end{bmatrix}$ $\frac{1}{2}\begin{bmatrix} 1 & 0 \\ 0 & 1 \\ 0 & 1 \\ 1 & 0 \end{bmatrix}$ $\frac{1}{2}\begin{bmatrix} 1 & 0 \\ 0 & 1 \\ 0 & -1 \\ 1 & 0 \end{bmatrix}$ $\frac{1}{2}\begin{bmatrix} 1 & 0 \\ 0 & 1 \\ 0 & 1 \\ -1 & 0 \end{bmatrix}$ $\frac{1}{2}\begin{bmatrix} 1 & 0 \\ 0 & 1 \\ 0 & -1 \\ -1 & 0 \end{bmatrix}$ |

Table 3 shows one example of a precoder for 4 Tx Rank-2.

TABLE 4

| Index 0 to 3 | $\frac{1}{2}\begin{bmatrix} 1 & 0 & 0 \\ 1 & 0 & 0 \\ 0 & 1 & 0 \\ 0 & 0 & 1 \end{bmatrix}$ $\frac{1}{2}\begin{bmatrix} 1 & 0 & 0 \\ -1 & 0 & 0 \\ 0 & 1 & 0 \\ 0 & 0 & 1 \end{bmatrix}$ $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ |
| --- | --- |
| Index 4 to 7 | $\frac{1}{2}\begin{bmatrix} 1 & 0 & 0 \\ 0 & 1 & 0 \\ 0 & 0 & 1 \\ 1 & 0 & 0 \end{bmatrix}$ $\frac{1}{2}\begin{bmatrix} 1 & 0 & 0 \\ 0 & 1 & 0 \\ 0 & 0 & 1 \\ -1 & 0 & 0 \end{bmatrix}$ $\frac{1}{2}\begin{bmatrix} 0 & 1 & 0 \\ 1 & 0 & 0 \\ 1 & 0 & 0 \\ 0 & 0 & 1 \end{bmatrix}$ $\frac{1}{2}\begin{bmatrix} 0 & 1 & 0 \\ 1 & 0 & 0 \\ -1 & 0 & 0 \\ 0 & 0 & 1 \end{bmatrix}$ |
| Index 8 to 11 | $\frac{1}{2}\begin{bmatrix} 0 & 1 & 0 \\ 1 & 0 & 0 \\ 0 & 0 & 1 \\ 1 & 0 & 0 \end{bmatrix}$ $\frac{1}{2}\begin{bmatrix} 0 & 1 & 0 \\ 1 & 0 & 0 \\ 0 & 0 & 1 \\ -1 & 0 & 0 \end{bmatrix}$ $\frac{1}{2}\begin{bmatrix} 0 & 1 & 0 \\ 0 & 0 & 1 \\ 1 & 0 & 0 \\ 1 & 0 & 0 \end{bmatrix}$ $\frac{1}{2}\begin{bmatrix} 0 & 1 & 0 \\ 0 & 0 & 1 \\ 1 & 0 & 0 \\ -1 & 0 & 0 \end{bmatrix}$ |

Table 4 shows one example of a precoder for 4 Tx Rank-3.

TABLE 5

$$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Table 5 shows one example of a precoder for 4 Tx Rank-4.

<Setting a Power Different Per Codeword>

Assuming that a power is set different per codeword, PUSCH uplink power control formula per carrier is proposed as Formula 1. In this specification, 'c', 'k' and 'm' indicate a carrier index, an antenna port index and a code word index, respectively.

[Formula 1]
$$P_{PUSCHc} = \min\left(P_{CMAXc}, \left[\sum_{k=0}^{K-1}\{\beta_k \cdot \min(P_{CMAXk}, P_{PUSCH,k})\}\right]_{dBm\ to\ Linear\ scale}\right)_{Linear\ to\ dBm\ scale}$$

$P_{CMAXc}$ indicates a maximum transmit power of a user equipment for a specific carrier index c. And, $P_{CMAXk}$ indicates a maximum transmit power of a user equipment for a specific antenna port k. $\beta_k$ is a scaling factor depending on whether a total power sum exceeds a component carrier (cc) maximum power. For instance, if the total power sum does not exceed the component carrier maximum power, this value can be set to 1. On the contrary, if the total power sum exceeds the component carrier maximum power, this value may be set to have the same value or a value different for each antenna. For instance, $\beta_k$ can be set to be scaled down to match a maximum power per antenna. Alternatively, a power can be reduced for a specific antenna only. And, $\beta_k$ may be signaled to a user equipment by an eNode B or may be determined by the user equipment itself.

In Formula 1, $P_{PUSCH, k}$ indicating a PUSCH transmit power at a specific antenna port k can be expressed as Formula 2.

$$P_{PUSCH,k} = 10\log_{10}(M_{PUSCHc,m(k)}) + P_{0\_PUSCHc} + \alpha_c(j) \cdot PL_c + \Delta_{TFc,m(k)} + f_c(i) + 10\log_{10}(PSF)$$ [Formula 2]

In Formula 2, PSF indicates a precoder scaling factor, it is
if 1Tx, PSF=1
else if 2Tx, PSF=½
else if 4Tx, PSF=¼, and 'm' indicates a codeword index. $M_{PUSCHc,m(k)}$ is the parameter indicating a bandwidth of PUSCH resource assignment expressed in the number of resource blocks valid for a specific codeword index and a specific antenna port index and is the value assigned by an eNode B. $P_{O\_PUSCHc}$ is the parameter configured with a sum of a cell-specific nominal component $P_{O\_NOMINAL\_PUSCH}(j)$ provided by a higher layer for a specific codeword index and a UE-specific component $P_{O\_UE\_PUSCH}(j)$ provided by the higher layer and is the value notified to a user equipment by an eNode B. Moreover, $\alpha_c(j)$ is a 3-bit cell-specific parameter provided by the higher layer for the specific codeword index and transmitted by an eNode B. If j=0 or 1, it is $\alpha_c \in \{0, 0.4, 0.5, 0.6, 0.7, 0.8, 0.9, 1\}$. If j=2, $\alpha_c(j)=1$. In this case, $\alpha_c(j)$ is the value notified to a user equipment by an eNode B.

pathloss ($PL_c$) is a downlink path loss (or signal loss) estimated value calculated by a user equipment by dB unit and can be expressed as '$PL_c$=referenceSignalPower−higher layer filteredRSRP'. In this case, referenceSignalPower can be notified via a higher layer to a user equipment by an eNode B. The $f_c(i)$ is the value indicating a current PUSCH power control adjusted status for a specific codeword index and may be represented as a current absolute value or a cumulative value. If Ks=0, the $f_c(i)$ means a different (or identical) TPC command. If Ks=1.25, it may mean a common (or different) TPC command. $P_{O\_PUSCHc}$, $\alpha_c$, and pathloss ($PL_c$) may be the values in common to each CC. The $\Delta_{TF}(i)$ defined LTE system is basically set to a value for a single codeword. For a specific codeword index, if Ks=1.25, $\Delta_{TF}(i)=10\log_{10}((2^{MPR \cdot Ks}-1)\beta_{offset}^{PUSCH})$. If Ks=0, $\alpha_{TF}(i)=0$, in this case, the Ks is a UE-specific parameter deltaMCS-Enabled provided via higher layer to a user equipment by an eNode B. If the symbols described in Formula 1 and Formula 2 are repeated in the following formulas, the descriptions of the same symbols may be omitted.

<Case of Setting Equal Power Per Codeword>

A case of setting an equal power per codeword according to another embodiment of the present invention is described as follows. First of all, if additional power settings are unnecessary by unit per antenna port, a power level is equal at antenna port irrespective of the number of codewords or layers. And, a total power value of the power levels just needs to be compared with a maximum power. Hence, in case that an equal power is set per codeword, Formula 1 can be simply expresses as Formula 3.

$$P_{PUSCHc} = \min\left\{P_{CMAXc}, \left[\sum_{k=0}^{K-1}(P_{PUSCH,k})\bigg|_{dBm\,to\,Linear\,scale}\right]\bigg|_{Linear\,to\,dBm\,scale}\right\}$$ [Formula 3]

In particular, PUSCH, k of Formula 3 can be expressed as Formula 4.

$$P_{PUSCH,k}=10\log_{10}(M_{PUSCH,m(k)})+P_{0\_PUSCHc}+\alpha_c(j)\cdot PL_c+\Delta_{TFc,m(k)}+f_c(i)+10\log_{10}(PSF)\,(dBm)$$ [Formula 4]

In Formula 4, resource sizes of codewords basically have the same value. Yet, one of the resource sizes may be different from the rest. If one of the resource sizes is different, it may be able to use one value represented as a sum, average, minimum value or maximum value of the resource sizes of the codewords. 'K' in Formula 3 may become the number of antennas effective for actual transmission of data. For instance, in case of a user equipment supportive of 4 Tx, if a specific antenna or a specific antenna group is turned off, the number of effective antennas becomes the number of the rest of the antennas except the number of the turned-off antennas. Alternatively, by interpreting 'K' as the number of all antennas, it may be able to set the value of $P_{PUSCH\_k}$ of the turned-off antenna to 0.

Likewise, in Formula 4, $P_{0\_PUSCHc}$, $\alpha_c$, pathloss ($PL_c$), or $f_c(i)$ may have the same value irrespective of codeword or antenna but may have a different value possibly. Regarding $\Delta_{TFc,m(k)}$, there is a method of applying the same scheme of LTE system or a method of using such a single value expressed as a function of 2 codewords as a sum, average, minimum or maximum value of codewords.

In Formula 4, when a sum of antenna powers exceeds a maximum power, a corresponding reduction can be made at the same rate per antenna. Alternatively, a different rate may be applicable to each different antenna. If this method is inserted as a $\beta_k$ form in the formula or applied to Formula 3, one of the following expressions including Formulas 5 to 7 is possible.

$$P_{PUSCHc} = \min\left(P_{CMAXc}, \sum_{k=0}^{K-1}\beta_k\cdot P_{PUSCH,k}\bigg|_{Linear\,scale\,to\,dBm}\right)$$ [Formula 5]

$$P_{PUSCHc} = \min(P_{CMAXc}, \beta\cdot P_{PUSCH,0}+10\log_{10}(K_{Effective\,Tx.antennas}))(dBm)$$ [Formula 6]

$$P_{PUSCHc} = \min(P_{CMAXc}, \beta\cdot P_{PUSCH,0}+10\log_{10}(PSF)+10\log_{10}(K_{Effective\,Tx.antennas}))(dBm)$$ [Formula 7]

In Formulas 5 to 7, $P_{PUSCH,0}$ may be defined as $P_{PUSCH,0}=10\log_{10}(M_{PUSCHc})+P_{0\_PUSCHc}+\alpha_c(j)\cdot PL_c\alpha\Delta_{TFc}+f_c(i)$. And, $P_{PUSCH,1}$ may be defined as $P_{PUSCH,1}=P_{PUSCH,0}+10\log_{10}(PSF)$, where $P_{PUSCH,1}$ means a power at an antenna port after passing through the MIMO block precoder 330 and corresponds to a power having an antenna factor applied thereto. In the following description of the present specification, the same expression is used. In particular, the $P_{PUSCH,0}$ and the $P_{PUSCH,1}$ indicate the power formula before passing through the MIMO block precoder 330 shown in FIG. 3 and the power formula after passing through the MIMO block precoder 330 shown in FIG. 3, respectively.

Alternatively, the per-carrier uplink PUSCH power control formula can be represented as Formula 8.

$$P_{PUSCHc}=P_{PUSCH,0}+10\log_{10}(K_{Effective\,Tx.antennas})$$ [Formula 8]

In Formula 8, $K_{Effective\,Tx.Antennas}$ means the number of effective antennas.

The $P_{PUSCH,0}$ in the formula '$P_{PUSCH,0}=10\log_{10}(M_{PUSCHc})+P_{0\_PUSCHc}+\alpha_c(j)\cdot PL_c+\Delta_{TFc}+f_c(i)$' mentioned in the foregoing description is the power level determined by the formula. Yet, a final power actually transmitted by a user equipment needs to be determined after compared to a UE maximum power level, which may be represented as $P'_{PUSCH,0}$ in Formula 9.

$$P'_{PUSCH,0}=\min(P_{CMAXc}-10^{log\,10(Ktotaltx.antennas)},P_{PUSCH,0})\,(dBm)$$ [Formula 9]

In Formula 9, $K_{TotalTx.Antennas}$ means a total antenna number. And, $P_{PUSCH,0}$ can be represented as Formula 10.

$$P_{PUSCH,0}=10\log_{10}(M_{PUSCHc})+P_{0\_PUSCHc}+\alpha_c(j)\cdot PL_c+\Delta_{TFc}+f_c(i)+10\log_{10}(PSF)$$ [Formula 10]

An expression for Formula 8 may be limited by a value defined unlike Formula 9 and Formula 10.

In the present specification, the $P_{PUSCH,0}$ means that a power of each layer stage is identical. The $P_{PUSCH,1}$ is the value after passing through the MIMO block precoder 330 and means that a power level of each antenna port is identical, which can be regarded as a power level before applying power compensation at a physical antenna stage.

When a precoding matrix having an antenna turn-off function is used, it may be able to consider a function of enabling a user equipment to use a maximum power instead of considering the purpose of power saving. In this case, PSF means that a 2X operation is performed on the former PSF defined in Formula 1 to enable 2Tx and 4Tx to become 1 and ½, respectively. If an eNode B signals such a specific value as '2' in accordance with a power class to a user equipment or signals a 1-bit indicator to a user equipment in case of antenna turn-off, it is able to indicate whether the user equipment performs a power saving or uses the whole power. Moreover, it may be able to use a random value. This may be performed on RRC level or can be configured by an eNode B by a shorter method. This may be applicable to Formula 1 and Formula 3 in common.

According to the above description, the uplink transmit power control formulas to enable a user equipment to transmit PUSCH before and after passing through the precoder 330 are explained. Yet, the above description is proposed on the assumption that there is no antenna gain imbalance between antennas. If there is antenna gain imbalance between antennas, it may be necessary to configure an uplink power control formula in consideration of such imbalance.

PUSCH uplink power control formula in consideration of antenna gain imbalance between antennas is described as follows.

<Method of Compensating for Antenna Gain Imbalance Elements>

In order to resolve the antenna gain imbalance between antennas of a user equipment, it may be able to configure PUSCH uplink power control formulas shown in Formula 11 and Formula 12 in a manner of adding an antenna gain imbalance compensation value G(k) to $P_{PUSCH,k}$ in Formula 1 and Formula 3, respectively. In particular, if G(k) is added to Formula 2, it may result in Formula 11. And, if G(k) is added to Formula 4, it may result in Formula 12. This is more preferable if such addition is applied on Rank 2 or higher instead of Rank 1. Yet, this does not mean that the application on Rank is excluded.

$$P_{PUSCH,k}=10\log_{10}(M_{PUSCHc,m(k)})+P_{0\_PUSCHc}+\alpha_c(j)\cdot PL_c+\Delta_{TFc,m(k)}+f_c(i)+10\log_{10}(PSF)+G(k) \quad \text{[Formula 11]}$$

In Formula 11, an eNode B may transmit G(k) to a user equipment by antenna unit or antenna group unit. G(k) has a unit of dBm and is an antenna gain imbalance (AGI) compensation value corresponding to an antenna index k. And, the G(K) may include a value notified to a user equipment by an eNode B or a value (i.e., a one-to-one compensation value of a power compensation value for AGI difference) previously determined by a user equipment.

$$P_{PUSCH,k}=10\log_{10}(M_{PUSCHc,m(k)})+P_{0\_PUSCHc}+\alpha_c(j)\cdot PL_c+\Delta_{TFc,m(k)}+f_c(i)+10\log_{10}(PSF)+G(k) \quad \text{[Formula 12]}$$

In Formula 12, G(k) is an AGI compensation value corresponding to an antenna index k and may include a value notified to a user equipment by an eNode B or a value previously determined by a user equipment.

By reflecting this G(k) value, a PUSCH power control formula for an antenna k can be finally represented as Formula 13.

$$P_{PUSCH,k}=\min(P_{CMAXc}-\Sigma_{k=0}^{Ktotal.tx.antennas-1}G(k)-10^{\log 10(Ktotaltx.antennas)}, P_{PUSCH,1})+G(K)^{KtotalTx.antennas} \quad \text{[Formula 13]}$$

In Formula 13, $K_{totaltx.antennas}$ indicates a total antenna number.

And, a PUSCH power control formula at a specific carrier index (c) may be represented as Formula 14.

$$P_{PUSCHc} = \left\{\sum_{k=0}^{K_{Effective\_antennas}}(P_{PUSCH,k})\Big|_{dBm\text{ to Linear scale}}\right\}\Big|_{Linear\text{ to }dBm} \quad \text{[Formula 14]}$$

In Formula 14, $P_{PUSCH,1}$ is equivalent to $P_{PUSCH,1}=P_{PUSCH,0}+10\log_{10}(PSF)$. This means that the same value is provided ed on every layer. And, a maximum power per antenna is $P_{CMAXc}-\Sigma_{k=0}^{Ktotaltx.antenna-1}G(k)-10\log_{10}(K_{TotalTx.antennas})$, which means that the same maximum power is provided at an antenna port. A final power value in Formula 13 may differ per antenna in accordance with a compensation portion depending on whether AGI occurs in a corresponding antenna. And, Formula 14 becomes a sum of total transmit powers of a user equipment.

In this case, $P_{PUSCH,0}$ may be represented as Formula 15.

$$P_{PUSCH,0}=10\log_{10}(M_{PUSCHc})+P_{0\_PUSCHc}+\alpha_c(j)\cdot PL_c+\Delta_{TFc}+f_c(i) \quad \text{[Formula 15]}$$

Formula 15 indicates a method of finding a basic power of one codeword on the assumption that powers of codewords are set equal to each other.

Formula 16 represents a power setting formula before AGI compensation at each antenna port.

$$P_{PUSCH,1} = P_{PUSCH,0}+10\log_{10}(N_{CWs})+10\log_{10}\left(\frac{1}{K_{TotalTx.antennas}}\right) \quad \text{[Formula 16]}$$

In Formula 16, $N_{CWs}$ indicates the total number of codewords assigned to a user equipment (This may have a type that a total power increases depending on the number of codewords. Occasionally, this value may be set to 1 to use irrespective of the number of actually assigned codewords). This is available in a manner of being set equal/unequal per codeword within the total power determined by Formula 15. Although the $N_{CWs}$ mentioned in the following is defined as the total codeword number, it may be set to 1 or an arbitrary value occasionally irrespective of the number of actually assigned codewords. And, the $K_{Total\,Tx.\,Antennas}$ indicates the total number of antennas configured in a user equipment.

Formula 17 represents a power setting formula in case of AGI compensation at each antenna port.

$$P_{PUSCH,k}=P_{PUSCH,1}+10\log_{10}(G(k)) \quad \text{[Formula 17]}$$

After the PUSCH transmit power has been set using the above formulas, if a total transmit power of all antennas is greater than a maximum power available for a user equipment, it may be necessary to be reset within a limited transmit power. Elements for the resetting within the limited transmit power may be represented as Formula 18.

$$\beta = \min\left(0, P_{CMAXc}-P_{PUSCH,0}-10\log_{10}\left(\frac{K_{eff.}}{K_{TotalTx.antennas}}\right)\right) \quad \text{[Formula 18]}$$

In Formula 18, the $K_{eff}$ indicates the total number of antennas in which actual data transmissions occur among all antennas. The $K_{Total\,Tx.\,Antennas}$ indicates the total number of antennas configured in a user equipment. And, Formula 18 corresponds to a method that can be taken into consideration in normal cases. Formula 19 corresponds to a method that can be taken into consideration in case of applying AGI compensation element for an antenna turn-off and an individual antenna.

$$\beta = \min\left(0, P_{CMAXc}-P_{PUSCH,0}-10\log_{10}(N_{CWs})-10\log_{10}\left(\frac{K_{eff.}}{K_{TotalTx.antennas}}\right)-\sum_{k=0}^{K_{Tot.}-1}G(k)\right) \quad \text{[Formula 19]}$$

In Formula 18 and Formula 19, the adjustment is performed on the basis of the same value per antenna. Yet, a different application may be applicable per antenna based on Formula 18 and Formula 19. For instance, it may be able to consider a method of giving a weight per specific antenna.

The $$\frac{K_{\mathit{eff.}}}{K_{\mathit{Total.Tx.antennas}}}$$

shown in Formula 18 or Formula 19 may be usable in a manner of being substituted with $$\sum_{i=0}^{K_{\mathit{Tot.Tx.antennas}}} |W_i|^2.$$

In this case, the $W_i$ means a non-zero coefficient in each row of the precoder matrixes defined in Tables 1 to 5 (In this case, a scaling value outside the precoder matrix is included). In particular, the $$\sum_{i=0}^{K_{\mathit{Tot.Tx.antennas}}} |W_i|^2$$

means a sum of squares of all coefficients of the precoder matrix. And, an antenna output power can be finally defined as Formula 20 and Formula 21.

$$P_{\mathit{PUSCH},1} + \beta(dB) \quad \text{[Formula 20]}$$

In this case, a parameter $\beta$ indicates a value for adjusting a transmit power per antenna.

$$P_{\mathit{PUSCH},c} = \min(P_{\mathit{CMAXc}}, P_{\mathit{PUSCH},1} - 10 \log_{10}(K_{\mathit{eff}})) \quad \text{[Formula 21]}$$

Formula 20 is represented as a final power of an individual antenna and Formula 21 is represented as a total sum of antenna ports. In case of Formula 21, if a power of $P_{\mathit{PUSCH},1} - 10 \log_{10}(K_{\mathit{eff}})$ exceeds $P_{\mathit{CMAXc}}$, it may include the meaning that equivalent power assignment is performed within $P_{\mathit{CMAXc}}$ for a power at each antenna port as soon as a transmit power becomes $P_{\mathit{CMAXc}}$.

According to the above descriptions so far, the transmit power setting method at an antenna port state is explained. In the following description, a method of finding a power at a front state of the mapping to a layer of codeword (CW to layer mapping) shown in FIG. 3 is explained. A power found by this method passes through a subsequent transmitting stage and can be then transmitted per antenna port.

$$P_{\mathit{PUSCH},0} = \min\left(P_{\mathit{CMAXc}} - 10\log_{10}(N_{\mathit{CWs}}) - 10\log_{10}\left(\sum_{i=0}^{K_{\mathit{Tot.Tx.antennas}}} |W_i|^2\right) - \sum_{i=0}^{K_{\mathit{Tot.Tx.antennas}}} G(k), P_{\mathit{PUSCH},0}\right) \quad \text{[Formula 22]}$$

In Formula 22, if a power of $P_{\mathit{PUSCH},0}$ exceeds a maximum antenna power, adjustment can be performed using G(k). This is only valid for performing the AGI compensation in Formula 22. If the AGI compensation is not performed in Formula 22, this value can be set to 0.

$$P_{\mathit{PUSCH},0} + 10\log_{10}(N_{\mathit{CWs}}) = \min\left(P_{\mathit{CMAXc}} - 10\log_{10}\left(\sum_{i=0}^{K_{\mathit{Tot.Tx.antennas}}} |W_i|^2\right) - \sum_{i=0}^{K_{\mathit{Tot.Tx.antennas}}} G(k), P_{\mathit{PUSCH},0} + 10\log_{10}(N_{\mathit{CWs}})\right) \quad \text{[Formula 23]}$$

In aspect of total power, Formula 23 may be regarded as another expression of Formula 22. If an AGI related item and a maximum power are exceeded, the same method is applicable.

$$P_{\mathit{Ant.}}^{\mathit{Total}} = \min\left(P_{\mathit{CMAXc}}, P_{\mathit{PUSCH},0}^{\mathit{Total}} + 10\log_{10}\left(\sum_{i=0}^{K_{\mathit{Tot.Tx.antennas}}} |W_i|^2\right) + \sum_{i=0}^{K_{\mathit{Tot.Tx.antennas}}} G(k)\right) \quad \text{[Formula 24]}$$

Unlike Formula 22 or Formula 23, Formula 24 is the formula re-expressed in viewpoint of a total power at an antenna port stage. In Formula 24, the $P_{\mathit{PUSCH},0}^{\mathit{Total}}$ indicates a total sum of codeword powers. In this case, the $P_{\mathit{CMAXc}}$ may have a definition that varies depending on an operation in power-saving mode (i.e., in this mode, a maximum transmit power of a user equipment is equivalently divided to become a maximum antenna power and an actual transmit power is set not to exceed the maximum antenna power) in case of antenna turn-off or an operation in non-power-saving mode. Similarly, it may be able to add/eliminate a corresponding term. In case of the power saving mode in case of the antenna turn-off, the $P_{\mathit{CMAXc}}$ can be substituted in a manner of Formula 24.

$$P_{\mathit{CMAXc}} - 10 \log_{10}(K_{\mathit{totalTx.antennas}}) \quad \text{[Formula 24]}$$

In Formula 24, the $K_{\mathit{totalTx.\ Antennas}}$ indicates the total number of antennas configured in a user equipment.

On the contrary, in case of the non-power saving mode in case of the antenna-turn off, it may be able to use the $P_{\mathit{CMAXc}}$ as it is. In particular, it may be able to use a configured power class of a corresponding antenna. For instance, in case of a user equipment supportive of 2 Tx antenna, when an antenna port 0 (Ant 0) and an antenna port 1 (Ant 1) are set to 20 dBm and 23 dBm, respectively, a maximum power per antenna becomes 20 dBm in the power saving mode in case of the antenna turn-off. Otherwise, when all maximum power of a user equipment is intended to use despite the antenna turn-off, the antenna port 1 (Ant 1) is used and a maximum power becomes 23 dBm.

The type of the $$\sum_{i=0} G(k)$$

mentioned in Formula 24 can be defined to perform an operation of $$\left\{ \sum_{i=0} G(k) \bigg|_{dB\,to\,Linear\,scale} \right\} \bigg|_{Linear\,to\,dB\,scale}.$$

The latter G(k) is converted to a linear scale by dB unit, undergoes an addition operation, and is then operated into dB scale.

A power control per codeword is described as follows. First of all, considering a case of transmitting 2 codewords, a codeword-specific differentiated parameter may include $\Delta_{TF}$. And, this value is related to a scheduled MCS (modulation and coding scheme) of each codeword. The $\Delta_{TF}$ different for each codeword causes a transmit power different per codeword and a transmit power different per antenna and requires a complicated adaptation functionality per antenna. To this end, since a performance difference between power/MCS adaptation and MCS-only adaptation is not significant, the same power is permitted despite using an MCS different per codeword only.

In transmission of 2 codewords, a transmit power of each of the codewords needs to be maintained equal. In particular, a power control per code word may not be necessary. Although a different MCS is used per codeword, if MCSs of the two codewords are different from each other, Ks may be set to 0.

Discussion on whether AGI compensation and per-antenna power control are necessary has been made. Although a power weight different on a water-pouring or a different PA (power amplifier) provides a marginal gain, it does not require an additional downlink signaling overhead on TPC command for multiple antennas. The per-antenna power control may cause complexity in viewpoints of power headroom report (PHR), scheduling/resource allocation and maximum power restriction scaling. The per-antenna power control may fatally work on a user equipment battery life. An uplink single-antenna port mode may be able to provide a transmission more efficient and better than that of a multi-antenna port mode.

The AGI compensation does not provide a sufficient gain and may have a negative effect in viewpoint of the user equipment battery life. Hence, the switching to TPMI (transmitted precoding matrix indicator) or uplink single-antenna mode is able to sufficiently compensate for the AGI without the per-antenna power control.

The maximum power restriction per carrier should be applied before the total transmit power restriction of a user equipment. In case of the uplink multiple transmitting antennas, whether the maximum power restriction per carrier is still sufficient or should be newly introduced is an issue. This issue actually depends on the necessity of the power control per codeword and/or the necessity of the power control per antenna. In technical aspect, since the transmit powers in multiple antennas are identical to each other, the maximum power restriction per antenna may be unnecessary. In case that both of the per-codeword power control and the per-antenna power control are not applied, it is enough with the per-carrier maximum power restriction and the per-antenna power restriction may be unnecessary.

Figure 4:
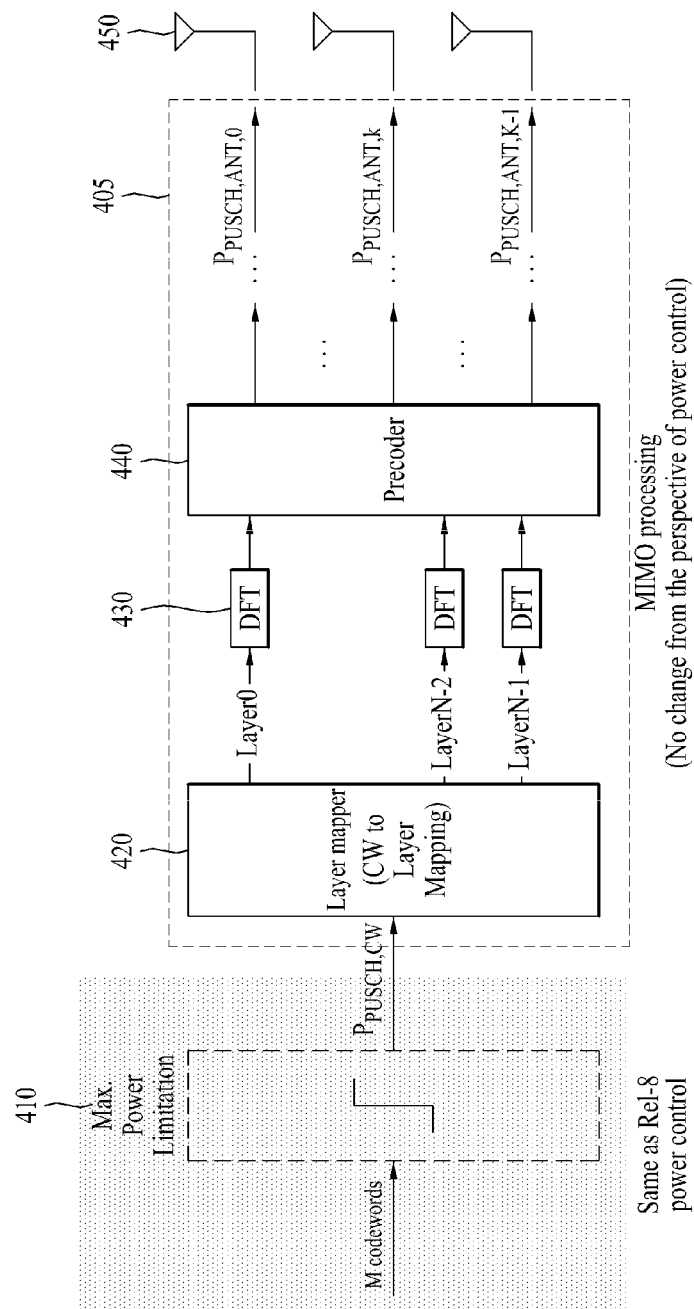
FIG. 4 is a diagram for another example of an uplink MIMO transmission chain of 3GPP Release-10 system as one example of a wireless communication system.

FIG. 4 is a diagram for another example of an uplink MIMO transmission chain of 3GPP Release-10 system as one example of a wireless communication system.

In the following description, an uplink SU-MIMO transmission and a related power control operation are explained with reference to FIG. 4. Referring to FIG. 4, a transmit power assigned to each codeword is identical and a transmit power through a PA (power amplifier) is identical as well. A maximum power control module 410 may be able to restrict a codeword power like 3GPP Release-8 power control. Codewords through the maximum power control module 410 are layer-mapped by a layer mapper 420. Discrete Fourier Transform is performed by a DFT module 430 through the layer mapper 420. A precoder 440 performs a transmission to an antenna stage 450 by applying precoding. Consequently, in case of FIG. 4, an MIMO processing stage 405 has no power variation in viewpoint of power control. In this case, it is advantageous in that there is no additional complexity and that a signaling overhead for a power control is reduced.

A total sum of codeword powers varies depending on the number of codewords. Regarding the description with reference to FIG. 4, a PUSCH uplink transmit power at a subframe index i after the maximum power control module 410 can be found using Formula 25.

$$P_{PUSCH,CW}(i) = \min\{P_{CMAX} + \beta \cdot 10 \log 10(2), 10 \log 10(M_{PUSCH}(i)) + P_{0,PUSCH}(j) + \alpha(j) \cdot PL + \Delta_{TF}(i) + f(i)\} \quad \text{[Formula 25]}$$

In Formula 25, $P_{CMAX}$ indicates a maximum transmit power. A parameter β is a parameter for supporting a different user equipment power configuration in assigning an antenna turn-off vector, where β∈{0,1}. The $M_{PUSCH}(i)$ is a parameter indicating a bandwidth of PUSCH resource allocation represented as the number of resource blocks effective fir a subframe index i and is a value assigned by an eNode B. The $P_{O\_PUSCH}(j)$ is a parameter configured with a cell-specific nominal component) $P_{O\_NOMINAL\_PUSCH}(j)$ provided by a higher layer and a UE-specific component $P_{O\_UE\_PUSCH}(j)$ provided by the higher layer and is a value notified to a user equipment by an eNode B. The α(j) is a cell-specific parameter transmitted with 3 bits by an eNode B by being provided by a higher layer. If j=0 or 1, α∈{0, 0.4, 0.5, 0.6, 0.7, 0.8, 0.9, 1. If j=2, α(j)=1. The α(j) is a value notified to a user equipment by an eNode B. The pathloss (PL) is a downlink path loss (or signal loss) estimated value calculated by a user equipment by dB unit. It is represented as $PL_c$=referenceSignalPower−higher layer filteredRSRP, where the referenceSignalPower can be notified via a higher layer to a user equipment by an eNode B.

The f(i) is the value indicating a current PUSCH power control adjusted state for a subframe index i and can be represented as a current absolute value or an accumulated value. The $\Delta_{TF}(i)$ defined in LTE system is basically set to a value for a single codeword. For a specific codeword, if $K_s$=125, it is $\Delta_{TF}(i) = 10 \log_{10}((2^{MPR \cdot K_s} - 1)\beta_{offset}^{PUSCH})$. If $K_s$=0, it becomes $\Delta_{TF}(i)$=0. In this case, the Ks is a UE-specific parameter deltaMCS-Enabled provided to a user equipment via a higher layer by an eNode B. If $K_s$=0, it becomes $\Delta_{TF}(i)$=0 and a transmit power per codeword becomes identical. Yet, if $K_s$=1.25, a transmit power can vary per codeword depending on a transmission information size of each codeword.

In accordance with an antenna configuration state of a user equipment, in case of an antenna turn-off, even if it is attempted to use a maximum power instead of power saving, whether to support is determined depending on an antenna power configuration. For instance, assume that a power amplifier/maximum power configuration of 2 Tx transmitting antennas includes a $1^{st}$ antenna set to 20 dBm and a $2^{nd}$ antenna set to 23 dBm. If a Transmitted Precoding Matrix Indicator (TPMI) is configured to turn off the $2^{nd}$ antenna but to use the $1^{st}$ antenna only, a user equipment operates in power saving mode only. On the contrary, if the $1^{st}$ antenna is turned off, it may be able to use a maximum power within the maximum power of the user equipment. Since an eNode B is aware of a power class of each antenna of the user equipment and the eNode B is sufficiently able to predict the TPMI as a value notified to the user equipment by the eNode B, a power saving mode or a maximum power transmission mode is operable depending on a presence or non-presence of the signaling from the eNode B. On the other hand, the user equipment may be able to determine whether to operate in the power saving mode or the maximum power transmission mode without the signaling from the eNode B.

As mentioned in the foregoing description, when the user equipment determines the parameter $\beta$ in Formula 25, the user equipment is able to set the parameter $\beta$ value to 0(OFF) or 1(ON) to use in relation with the antenna power configuration and the TPMI. This is used as a function of enabling/disabling the element of Formula 2 for an operation with the parameter $\beta$. When the eNode B signals the parameter $\beta$ to the user equipment, a 1-bit indicator can be transmitted to the user equipment in a manner of being contained in a conventionalLTE DCI format 0 or a new format for SU-MIMO (Single User-MIMO). Alternatively, the 1-bit indicator may be transmitted in a manner of being contained in a new format for sending one independent information. Alternatively, the 1-bit indicator may be transmitted in a manner of being contained in the signaling method sent to the user equipment by the eNode B.

A total transmit power indicated by Formula 25 may be distributed to each antenna in a manner of Formula 26.

$$P_{PUSCH,ANT,k}(i)=P_{PUSCH,CW}(i)+10 \log_{10}(|w_{k,l}|^2) \quad \text{[Formula 26]}$$

In Formula 26, the $w_{k,l}$ indicates an element at $k^{th}$ row and $1^{th}$ column of a precoding matrix including a precoding scaling factor, wherein the l indicates a layer index mapped to a $k^{th}$ antenna. Some of the $w_{k,l}$ may be set to 0. When an antenna turn-off vector is assigned, the corresponding antenna transmit power may be 0.

A formula for PUSCH uplink transmit power at a subframe index i may have a configuration of Formula 27 as well as that of Formula 25. Meanwhile, details of the setting methods related to Formula 25 and Formula 26 may be exactly applicable to the following formula.

$$P_{PUSCH,CW}(i)=10 \log 10(M_{PUSCH}(i))+P_{0,PUSCH}(j)+\alpha(j) \cdot PL+\Delta_{TF}(i)+f(i) \quad \text{[Formula 27]}$$

Moreover, a total transmit power of all antennas passes through an MIMO block (precoder) and may be then distributed per antenna port. And, a power at an antenna port k may be represented as Formula 28.

$$P_{PUSCH,ANT,k}(i)=P_{PUSCH,CW}(i)+10 \log_{10}(|w_{k,l}|^2) \quad \text{[Formula 28]}$$

Meanwhile, a total transmit power at a subframe index i per carrier may be represented as Formula 29.

$$P_{PUSCHc}(i) = \min\left\{P_{CMAXc} - \beta \cdot 10\log_{10}(2), \sum_{k=0}^{K-1} P_{PUSCH,Ant,k}(i)\right\} \quad \text{[Formula 29]}$$

In Formula 29, a numeral '2' shown in $\beta \cdot 10 \log_{10}(2)$ of Formula 29 is just one example and can be set to other numerals. This numeral is available in a manner of being notified to a user equipment by an eNode B or being set up by the user equipment.

A formula for PUSCH uplink transmit power at a subframe index i may have a configuration of Formula 30 as well as that of Formula 25 or Formula 27. Meanwhile, details of the setting methods related to Formula 25 and Formula 26 may be exactly applicable to the following formula.

$$P_{PUSCH,CW}(i)=10 \log 10(M_{PUSCH}(i))+P_{0,PUSCH}(j)+\alpha(j) \cdot PL+\Delta_{TF}(i)+f(i) \quad \text{[Formula 30]}$$

Moreover, a total transmit power of all antennas passes through an MIMO block precoder 330 and may be then distributed per antenna port. And, a power at an antenna port k may be represented as Formula 31.

$$P_{PUSCH,ANT,k}(i)=P_{PUSCH,CW}(i)+10 \log_{10}(|w_{k,l}|^2)+\beta \cdot 10 \log 10(S) \quad \text{[Formula 31]}$$

In Formula 31, a value 'S' is an element of enabling a maximum transmit power and may be preferably set to a numeral '2'. Alternatively, the value 'S' may be set to an arbitrary value. The value 'S' may be available in a manner of being notified to a user equipment by an eNode B or being set up by the user equipment. A total transmit power may be represented as Formula 32.

$$P_{PUSCHc}(i) = \min\left\{P_{CMAXc}, \sum_{k=0}^{K-1} P_{PUSCH,Ant,k}(i)\right\} \quad \text{[Formula 32]}$$

A formula for PUSCH uplink transmit power at a subframe index i may have a configuration of Formula 33 as well as that of Formula 25, Formula 27, or Formula 30. Meanwhile, details of the setting method related to Formula 25 and Formula 26 may be exactly applicable to the following formula.

$$P_{PUSCH,CW}(i)=10 \log 10(M_{PUSCH}(i))+P_{0,PUSCH}(j)+\alpha(j) \cdot PL+\Delta_{TF}(i)+f(i) \quad \text{[Formula 33]}$$

Moreover, a total transmit power of all antennas passes through an MIMO block (precoder) and may be then distributed per antenna port. And, a power at an antenna port k may be represented as Formula 34.

$$P_{PUSCH,ANT,k}(i)=P_{PUSCH,CW}(i)+10 \log_{10}(|w_{k,l}|^2)+\beta \cdot 10 \log 10(S) \quad \text{[Formula 34]}$$

In Formula 34, a value 'S' is an element of enabling a maximum transmit power and may be preferably set to a numeral '2'. Alternatively, the value 'S' may be set to an arbitrary value. The value 'S' may be available in a manner of being notified to a user equipment by an eNode B or being set up by the user equipment. A total transmit power of the user equipment may be represented as Formula 35.

$$P_{PUSCHc}(i) = \min\left\{P_{CMAXc} - \gamma \cdot 10\log 10(S\_1), \sum_{k=0}^{K-1} P_{PUSCH,Ant,k}(i)\right\} \quad \text{[Formula 35]}$$

Formula 35 may be considered for a case of a non-antenna turn-off and a case of an antenna turn-off. In particular, Formula 35 may be further considered for an operation in power saving mode and a case of an operation in maximum power transmission mode. In Formula 35, values of $\beta$ and $\gamma$ may be set as Table 6.

TABLE 6

|  | β | γ |
| --- | --- | --- |
| Non antenna Turn-off | 0 | 0 |
| Antenna Turn-off — Power saving mode | 0 | 1 |
| Antenna Turn-off — Max. power Tx mode | 1 | 0 |

Referring to Table 6, for example, in case of non-antenna turn-off, each of the values of β and γ may be set to 0. In case of antenna turn-off, in power saving mode, β and γ may be set to 0 and 1, respectively. In case of the antenna turn-off, in maximum power transmission mode, β and γ may be set to 1 and 0, respectively. In Formula 35, each of the S and the S_1 is preferably set to 2. Alternatively, each of S and the S_1 may be set to an arbitrary value. In the maximum power transmission mode, in case of antenna turn-off, it may be able to consider a case that all powers including a power assigned to an unused antenna are used (i.e., a total power of a user equipment is used in a manner of evenly assigned to all antennas) or a case that a maximum power of the user equipment is fully used in consideration of a relation between a PA configuration of antennas and a total power of the user equipment.

The contents in Table 6 may be signaled to a user equipment by an eNode B or may be set to values known to both of the user equipment and the eNode B in a manner of being set up by the user equipment. Moreover, combinations other than the example shown in Table 6 are available. Moreover, the contents in Table 6 may be transmitted to a user equipment by an eNode B in a manner of being contained in a downlink control signaling message. Alternatively, the contents in Table 6 may be transmitted individually or in a manner of being contained in a conventional message.

A formula for PUSCH uplink transmit power at a subframe index i may have a configuration of Formula 36 as well as that of Formula 25, Formula 27, Formula 30 or Formula 33. Meanwhile, details of the setting method related to Formula 25 and Formula 26 may be exactly applicable to the following formula.

$$P_{PUSCH,CW}(i) = 10 \log 10(M_{PUSCH}(i)) + P_{0,PUSCH}(j) + \alpha(j) \cdot PL + \Delta_{TF}(i) + f(i) \qquad \text{[Formula 36]}$$

Unlike the above method, it is a per-antenna power setting method by applying antenna maximum power limit (antenna max. power limit). A power at each antenna port may be represented as Formula 37.

$$P_{PUSCH,ANT,k}(i) = \min\{P_{CMAX,k} + \gamma \cdot 10 \log 10(S\_1), \\ P_{PUSCH,CW}(i) + 10 \log_{10}(|w_{k,l}|^2) + \beta \cdot 10 \log 10(S)\} \qquad \text{[Formula 37]}$$

The contents of Formula 33 may be exactly applicable to the value settings of β and γ. Moreover, the contents of Formula 33 may be exactly applicable to the method of setting detailed parameters. As mentioned in the foregoing description, the $\Delta_{TF}(i)$ defined in LTE system is basically set to a value for a single codeword. For a specific codeword index, if $K_s = 1.25$, it is $\Delta_{TF}(i) = 10 \log_{10}((2^{MPR \cdot K_s} - 1)\beta_{offset}^{PUSCH})$. If $K_s = 0$, it is $\Delta_{TF}(i) = 0$. In this case, the $K_s$ is a UE-specific parameter deltaMCS-Enabled provided via a higher layer to a user equipment by an eNode B. It is MPR=$O_{CQI}/N_{RE}$ for control data transmitted on PUSCH without UL-SCH (uplink shared channel) data. Otherwise, it is $$\sum_{r=0}^{C-1} K_r / N_{RE}.$$

In this case, the C indicates the number of code blocks, the $K_r$ indicates a size for a code block r, the $O_{CQI}$ indicates the number of CQI bits including CRC bits, the $N_{RE}$ indicates the number of resource elements determined as $N_{RE} = M_{sc}^{PUSCH-initial} \cdot N_{symb}^{PUSCH-initial}$, and the $N_{symb}^{PUSCH-initial}$ indicates the number of SC-FDMA symbols carrying PUSCH in an initial PUSCH transmission subframe.

Yet, another method is applicable. For instance, if $K_s = 1.25$, Definition may be made like Formula 38.

$$MPR = \frac{1}{Q} \cdot \sum_{m=0}^{Q-1} \sum_{r=0}^{C_m-1} K_r / N_{RE} \qquad \text{[Formula 38]}$$

In Formula 38, the Q indicates a total number of codewords. The $K_r$ indicates a code block size and may be variable per codeword. If the $K_r$ varies per codeword, a per-codeword code block size may be used. The $N_{RE}$ is basically used as one common value irrespective of the number of codewords but may be available in a manner of being set to a different value. Meanwhile, the MPR may be defined as Formula 39.

$$MPR = \frac{1}{Q} \cdot \sum_{m=0}^{Q-1} \sum_{r=0}^{C_m-1} K_{r,m} / N_{RE,m} \qquad \text{[Formula 39]}$$

In Formula 39, the Q is applicable in a manner of being set to one of 1, an arbitrary number, a total codeword number and the like. This is available by a method determined by an eNode B and a user equipment. In Formula 39, if the Q is set to 1, MPR part is represented as a sum of codewords. The MPR value may vary depending on a method of setting a Q value. For instance, it may be available by a summing method, an averaging method or the like.

Alternatively, unlike the above method, it may be able to consider a method of finding $\Delta_{TF}(i)$ per codeword and then adding the found values, a method of using an average value, a method of using a maximum value, a method of using a minimum value and the like. This is because a power may be assigned in accordance with $\Delta_{TF}(i)$ size of each codeword.

As mentioned in the foregoing description, the 3GPP Rel-8 uplink power control (UL PC), as shown in FIG. 4, may be applicable in a manner of simply extending to the Rel-10 uplink power control for SU-MIMO. Hence, in transmitting 2 codewords, a transmit power of each codeword is maintained. In particular, a per-codeword power control is not necessary. In case that a different MCS per codeword is allowed, when MCSs of two codewords are different from each other, it may be able to set $K_s = 0$.

The various kinds of uplink power control formulas mentioned in the foregoing description may correspond to the uplink power control formulas in a serving cell currently transmitting and receiving signals, by which the uplink power control formulas may be non-limited.

According to the various uplink power control formulas described so far, a power control of a user equipment adopting multiple antennas is further facilitated and simplified.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a user equipment for controlling an uplink transmit power for transmitting a plurality of codewords in a wireless communication system supportive of a plurality of antennas and method thereof are industrially applicable to various wireless communication systems including 3GPP LTE, LTE-A and the like.

What is claimed is:

1. A method of controlling uplink transmission power for transmitting a plurality of codewords by a user equipment in a wireless communication system supportive of a plurality of antennas, the method comprising:
   receiving an indicator regarding uplink transmission power determination per codeword for transmitting the plurality of codewords from an eNode B; and
   determining the uplink transmission power for transmitting the plurality of codewords based on an indication value of the indicator,
   wherein if the indicator indicates a first value, the uplink transmission power is determined such that a same uplink transmission power is assigned to each codeword, and
   wherein if the indicator indicates a second value, the uplink transmission power is determined such that an uplink transmission power of each codeword is assigned based on a size of transmission information of each codeword.

2. The method of claim 1, wherein if the indicator value is the first value is 0.

3. The method of claim 1, wherein the second value is 1.25.

4. The method of claim 1, further comprising:
   controlling a determined total uplink transmission power such that the determined total uplink transmission power for transmitting the plurality of codewords does not exceed a maximum power limit value.

5. The method of claim 1, wherein the uplink transmission power is further controlled based on an indicator indicating that a specific antenna among the plurality of antennas is turned off.

6. The method of claim 1, wherein the determined uplink transmission power for transmitting the plurality of codewords is provided for a transmission in a serving cell among component carriers.

7. The method of claim 1, wherein the determination of the uplink transmission power for transmitting the plurality of codewords is made for a physical uplink shared channel (PUSCH) transmission.

8. The method of claim 1, wherein the indicator comprises a deltaMCS-Enabled parameter.

9. A user equipment configured to control an uplink transmission power for transmitting a plurality of codewords in a wireless communication system supportive of a plurality of antennas, the user equipment comprising:
   a receiver configured to receive an indicator regarding uplink transmission power determination for the plurality of codewords from an eNode B; and
   a processor configured to determine the uplink transmission power for transmitting the plurality of codewords based on an indication value of the indicator,
   wherein if the indicator indicates a first value, the uplink transmission power is determined such that a same uplink transmission power is assigned to each codeword, and
   wherein if the indicator indicates a second value, the uplink transmission power is determined such that an uplink transmission power of each codeword is assigned based on a size of transmission information of each codeword.

10. The user equipment of claim 9, wherein the first value is 0.

11. The user equipment of claim 9, wherein the second value is 1.25.

12. The user equipment of claim 9, wherein the indicator comprises a deltaMCS-Enabled parameter.

* * * * *